United States Patent
Gu

(10) Patent No.: US 11,755,787 B2
(45) Date of Patent: *Sep. 12, 2023

(54) SYSTEM, METHOD, AND COMPUTER PROGRAM PRODUCT FOR ENCRYPTING SENSITIVE DATA USING A FIELD PROGRAMMABLE GATE ARRAY

(71) Applicant: Visa International Service Association, San Francisco, CA (US)

(72) Inventor: Shengfei Gu, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,057

(22) Filed: Jul. 7, 2022

(65) Prior Publication Data

US 2022/0343033 A1  Oct. 27, 2022

Related U.S. Application Data

(63) Continuation of application No. 16/745,697, filed on Jan. 17, 2020, now Pat. No. 11,403,433.

(51) Int. Cl.
*G06F 21/00* (2013.01)
*G06F 21/76* (2013.01)
(Continued)

(52) U.S. Cl.
CPC .......... *G06F 21/76* (2013.01); *G06F 21/602* (2013.01); *G06F 21/6245* (2013.01); *G06F 21/64* (2013.01)

(58) Field of Classification Search
CPC .... G06F 21/76; G06F 21/602; G06F 21/6245; G06F 21/64
See application file for complete search history.

(56) References Cited

U.S. PATENT DOCUMENTS 8,095,508 B2  1/2012  Chamberlain et al.
8,983,063 B1  3/2015  Taylor et al.
(Continued)

FOREIGN PATENT DOCUMENTS

CN  109032934 A  12/2018
KR  101954863 B1  3/2019
(Continued)

OTHER PUBLICATIONS

Banu, "FPGA Based Hardware Implementation of Encryption Algorithm", International Journal of Engineering and Advanced Technology (IJEAT), Apr. 2014, pp. 271-277, vol. 3:4, Blue Eyes Intelligence Engineering & Sciences Publication Pvt. Ltd., ISSN: 2249-8958. Retrieved from https://www.ijeat.org/wp-content/uploads/papers/v3i4/D2904043414.pdf.
(Continued)

*Primary Examiner* — Ghazal B Shehni
(74) *Attorney, Agent, or Firm* — THE WEBB LAW FIRM

(57) ABSTRACT

Provided is a system including at least one host application processor and at least one field programmable gate array (FPGA) device coupled to the at least one host application processor via a communication bus, the at least one host application processor is programmed or configured to receive a transaction data record comprising transaction data associated with a payment transaction, transmit the transaction data record to the at least one FPGA device via the communication bus, and receive an encrypted transaction data record from the at least one FPGA device via the communication bus, wherein one or more data fields of the transaction data record are encrypted to generate the encrypted transaction data record. A method and computer program product are also provided.

20 Claims, 12 Drawing Sheets

400

(51) Int. Cl.
*G06F 21/64* (2013.01)
*G06F 21/60* (2013.01)
*G06F 21/62* (2013.01)

(56) References Cited

U.S. PATENT DOCUMENTS

| | | | |
|---|---|---|---|
| 9,076,003 | B2 | 7/2015 | Raskin et al. |
| 9,367,693 | B2 | 6/2016 | Kocher et al. |
| 9,613,017 | B2 | 4/2017 | Spada et al. |
| 10,262,141 | B2 | 4/2019 | Kocher et al. |
| 2002/0199110 | A1* | 12/2002 | Kean ............ G06Q 30/06 713/189 |
| 2003/0065626 | A1 | 4/2003 | Allen |
| 2008/0270805 | A1 | 10/2008 | Kean |
| 2010/0031026 | A1 | 2/2010 | Cizas et al. |
| 2016/0071096 | A1 | 3/2016 | Rosea |
| 2019/0005254 | A1 | 1/2019 | Arasu et al. |
| 2021/0264410 | A1* | 8/2021 | Paek ............ H04L 9/0825 |

FOREIGN PATENT DOCUMENTS

| | | |
|---|---|---|
| WO | 0231647 A2 | 4/2002 |
| WO | 2018218349 A1 | 12/2018 |

OTHER PUBLICATIONS

Edwards, "FPGA-based speech encrypting and decrypting embedded system", Mar. 1, 2009, pp. 1-4. Retrieved from https://www.techdesignforums.com/practice/technique/fpga-based-speech-encrypting-and-decrypting-embedded-system/.

Parrinha et al., "Flexible and Low-Cost HSM based on Non-Volatile FPGAs", INESC-ID, IST, Universidade de Lisboa, 2017, pp. 1-8. Retrieved from https://www.inesc-id.pt/publications/14390/pdf/.

Samanta, "FPGA Implementation of AES Encryption and Decryption", B.E. III Yr, Electronics & Communication Engg, Sardar Vallabhbhai National Institute of Technology, Surat., 2007, pp. 1-11. Retrieved from https://www.design-reuse.com/articles/13981/fpga-implementation-of-aes-encryption-and-decryption.html.

* cited by examiner

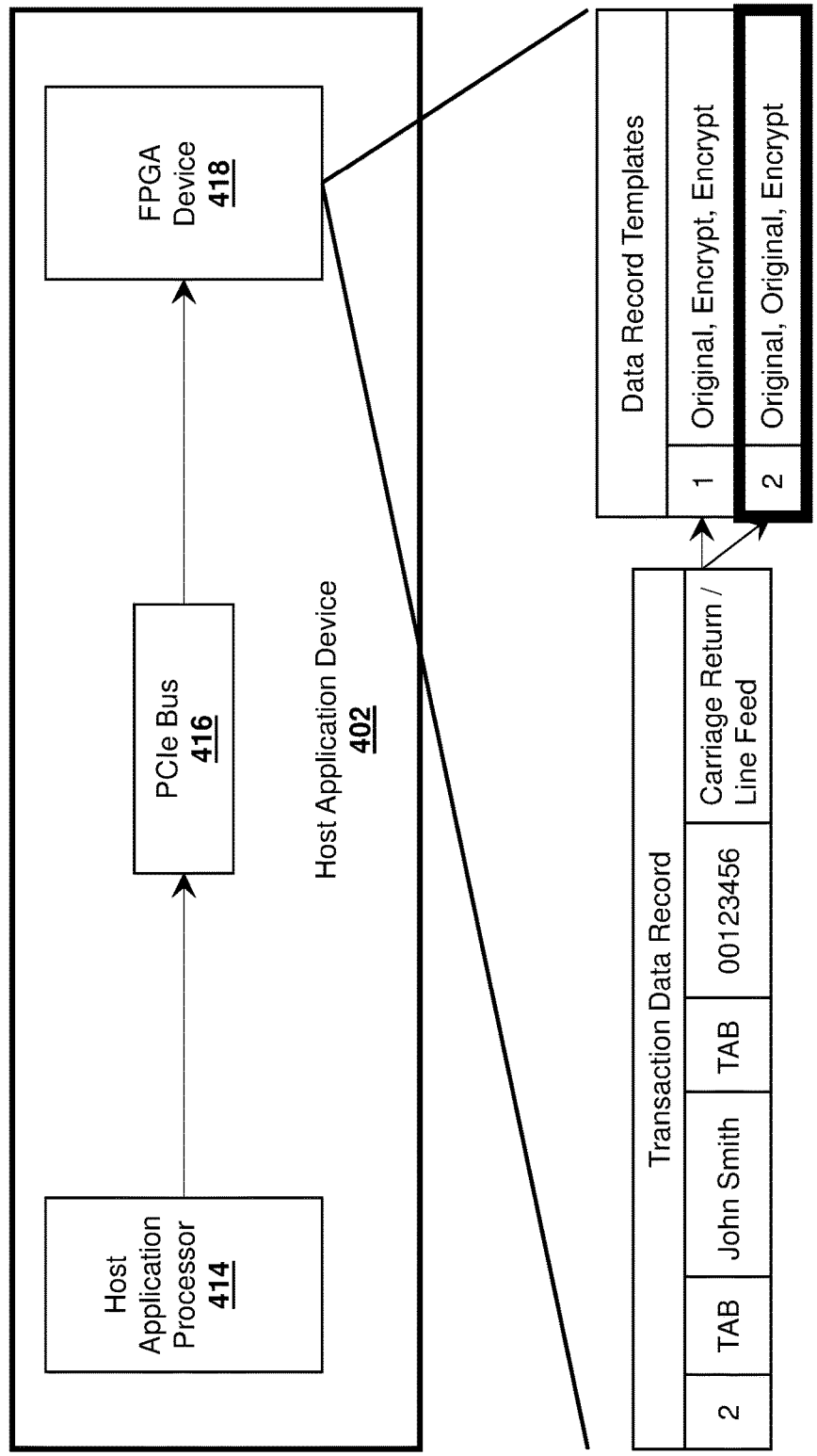

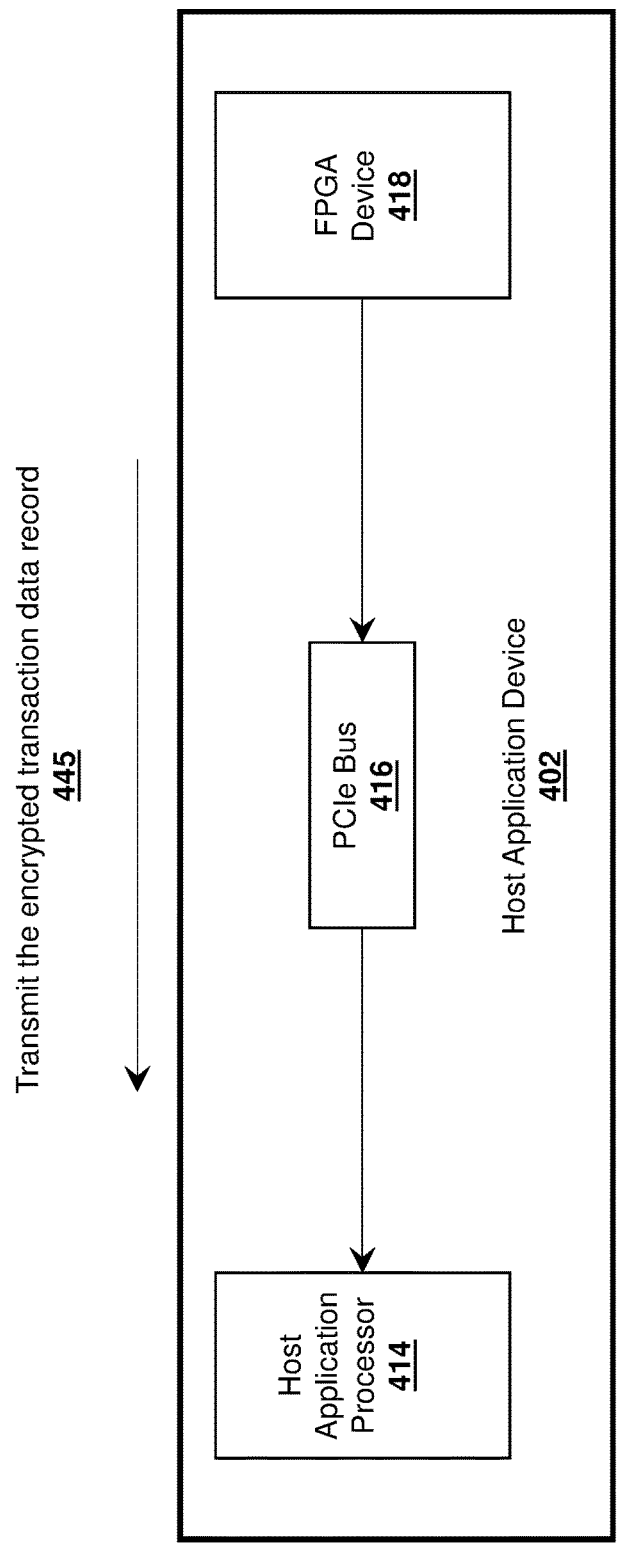

SYSTEM, METHOD, AND COMPUTER PROGRAM PRODUCT FOR ENCRYPTING SENSITIVE DATA USING A FIELD PROGRAMMABLE GATE ARRAY

CROSS REFERENCE TO RELATED APPLICATION

The present application is a continuation application of U.S. patent application Ser. No. 16/745,697, filed Jan. 17, 2020, the disclosure of which is hereby incorporated by reference in its entirety.

BACKGROUND

1. Field

This disclosure relates generally to encryption of sensitive data and, in some non-limiting aspects or embodiments, to systems, methods, and computer program products for encrypting sensitive data using a field programmable gate array (FPGA) device.

2. Technical Considerations

A central processing unit (CPU), such as a central processor or main processor, may include the electronic circuitry within a computing device that executes instructions that make up a computer program. The CPU may perform basic operations, such as arithmetic, logic, control, and input/output (I/O) operations specified by the instructions. The principal components of a CPU may include an arithmetic logic unit (ALU) that performs arithmetic and logic operations, processor registers that supply operands to the ALU and store the results of ALU operations, and a control unit that orchestrates retrieval (e.g., fetching) and execution of instructions by directing the coordinated operations of the ALU, registers, and/or other components. In some examples, a CPU may include a microprocessor. In such an example, the CPU may be contained on a single metal-oxide-semiconductor (MOS) integrated circuit (IC) chip. An IC that contains a CPU may also contain memory, peripheral interfaces, and/or other components of a computing device. Such integrated devices may be referred to as systems on a chip (SoC).

In some instances, a computing, extract, transform, load (ETL) process may refer to a general procedure that involves copying data from one or more source systems into a destination system that represents the data differently from how the data is represented in the one or more source systems or in a different context from the context of the data in the one or more source systems. As the name implies, an ETL process may involve data extraction, data transformation, and data loading. Data extraction may involve extracting data (e.g., a dataset) from a homogeneous source and/or a heterogeneous source. Data transformation may involve processing the data by performing data cleansing operations and transforming the data into a proper storage format and/or structure for later use (e.g., for querying and/or analysis). Lastly, data loading may involve the insertion of the data into a final target data storage location, such as an operational data store, a data mart, a data lake, or a data warehouse.

In some instances, a host computing device with a CPU may perform an ETL process on data and during the ETL process, some of the data may need to be encrypted by the host computing device. In such an example, the host computing device may request and receive an encryption key and/or a decryption key from a separate (e.g., remote) computing device. However, the encryption key and/or decryption key may be vulnerable to detection when the encryption key and/or decryption key is transmitted by the separate computing device to the host computing device over a communication network. In addition, during the ETL process, the host computing device may only be able to parse the data in serial process based on the CPU.

SUMMARY

Disclosed are systems, methods, and computer program products for encrypting sensitive data using a field programmable gate array (FPGA) device.

According to some non-limiting embodiments or aspects, provided is a system, comprising: at least one host application processor; at least one FPGA device coupled to the at least one host application processor via a communication bus; wherein the at least one host application processor is programmed or configured to: receive a transaction data record comprising transaction data associated with a payment transaction; transmit the transaction data record to the at least one FPGA device via the communication bus; and receive an encrypted transaction data record from the at least one FPGA device via the communication bus, wherein one or more data fields of the transaction data record are encrypted to generate the encrypted transaction data record.

According to some non-limiting embodiments or aspects, provided is a computer-implemented method, comprising: receiving, with at least one processor of a computing device, a transaction data record comprising transaction data associated with a payment transaction; transmitting, with at least one processor of the computing device, the transaction data record to a FPGA device of the computing device; and receiving, with at least one processor of the computing device, the encrypted transaction data record from the FPGA device of the computing device, wherein one or more data fields of the transaction data record are encrypted to generate the encrypted transaction data record.

According to some non-limiting embodiments or aspects, provided is a computer program product, comprising at least one non-transitory computer-readable medium including one or more instructions that, when executed by at least one processor, cause the at least one processor to: receive a transaction data record comprising transaction data associated with a payment transaction; transmit the transaction data record to a FPGA device of a computing device; select a data record template from among a plurality of templates based on a format of the transaction data record; determine one or more data fields of the transaction data record based on the data record template; and receive an encrypted transaction data record from the FPGA device, wherein data values included in the one or more data fields of the transaction data record are encrypted using an encryption key stored in the FPGA device.

Further non-limiting aspects or embodiments are set forth in the following numbered clauses:

Clause 1: A system, comprising: at least one host application processor; at least one field programmable gate array (FPGA) device coupled to the at least one host application processor via a communication bus; wherein the at least one host application processor is programmed or configured to: receive a transaction data record comprising transaction data associated with a payment transaction; transmit the transaction data record to the at least one FPGA device via the communication bus; and receive an encrypted transaction data record from the at least one FPGA device via the communication bus, wherein one or more data fields of the transaction data record are encrypted to generate the encrypted transaction data record.

Clause 2: The system of clause 1, wherein the at least one FPGA device, when encrypting the one or more data fields of the transaction data record to generate the encrypted transaction data record, is configured to: encrypt the one or more data fields of the transaction data record using an encryption key stored in read-only memory (ROM) of the at least one FPGA device.

Clause 3: The system of clauses 1 or 2, wherein the at least one FPGA device, when encrypting the one or more data fields of the transaction data record to generate the encrypted transaction data record, is configured to: select a data record template from among a plurality of data record templates based on a format of the transaction data record; determine the one or more data fields of the transaction data record based on the data record template; and encrypt data values included in the one or more data fields of the transaction data record using an encryption key stored in the at least one FPGA device.

Clause 4: The system of any of clauses 1-3, wherein the at least one host application processor is further programmed or configured to: store the encrypted transaction data record in a database based on receiving the encrypted transaction data record from the at least one FPGA device.

Clause 5: The system of any of clauses 1-4, wherein the at least one host application processor is further programmed or configured to: receive a request for the transaction data record; retrieve the encrypted transaction data record from the database; transmit the encrypted transaction data record to the at least one FPGA device; and receive a decrypted transaction data record from the at least one FPGA device, wherein one or more data fields of the encrypted transaction data record are decrypted to generate the decrypted transaction data record.

Clause 6: The system of any of clauses 1-5, wherein the at least one host application processor, when retrieving the encrypted transaction data record from the database, is programmed or configured to: determine a data record identifier of the transaction data record from the request; and retrieve the encrypted transaction data record from the database based on the data record identifier.

Clause 7: The system of any of clauses 1-6, wherein the at least one host application processor is further programmed or configured to: receive data associated with an encryption key; and update a configuration of the at least one FPGA device based on the data associated with the encryption key.

Clause 8: The system of any of clauses 1-7, wherein the at least one FPGA device, when transmitting the transaction data record to the at least one FPGA device, is programmed or configured to: transmit the transaction data record to the at least one FPGA device via a peripheral component interconnect express (PCIe) bus, and wherein the at least one FPGA device, when receiving the encrypted transaction data record from the at least one FPGA device, is programmed or configured to: receive the encrypted transaction data record from the FPGA device via a PCIe bus.

Clause 9: A computer-implemented method, comprising: receiving, with at least one processor of a computing device, a transaction data record comprising transaction data associated with a payment transaction; transmitting, with at least one processor of the computing device, the transaction data record to a field programmable gate array (FPGA) device of the computing device; and receiving, with at least one processor of the computing device, the encrypted transaction data record from the FPGA device, wherein one or more data fields of the transaction data record are encrypted to generate the encrypted transaction data record.

Clause 10: The computer-implemented method of clause 9, wherein encrypting the one or more data fields of the transaction data record comprises: selecting a data record template from among a plurality of templates based on a format of the transaction data record; determining the one or more data fields of the transaction data record based on the data record template; and encrypting data values included in the one or more data fields of the transaction data record using an encryption key stored in the FPGA device.

Clause 11: The computer-implemented method of clauses 9 or 10, wherein the one or more data fields are one or more first data fields of the transaction data record and wherein encrypting the one or more first data fields of the transaction data record comprises: foregoing encrypting one or more second data fields of the transaction data record, wherein the one or more second fields of the transaction data record comprise one or more data fields reserved for non-confidential data.

Clause 12: The computer-implemented method of any of clauses 9-11, further comprising: storing the encrypted transaction data record in a database based on receiving the encrypted transaction data record from the FPGA device.

Clause 13: The computer-implemented method any of clauses 9-12, further comprising: receiving a request for the transaction data record; retrieving the encrypted transaction data record from the database; transmitting the encrypted transaction data record to the FPGA device; decrypting the one or more data fields of the encrypted transaction data record using a decryption key stored in the FPGA device to generate a decrypted transaction data record; and receiving the decrypted transaction data record from the FPGA device.

Clause 14: The computer-implemented method any of clauses 9-13, wherein retrieving the encrypted transaction data record from the database comprises: determining a data record identifier from the request for the transaction data record; and retrieving the encrypted transaction data record from the database based on the data record identifier.

Clause 15: The computer-implemented method any of clauses 9-14, further comprising: receiving data associated with an encryption key; and updating a configuration of the FPGA device based on the data associated with the encryption key.

Clause 16: The computer-implemented method any of clauses 9-15, wherein transmitting the transaction data record to the FPGA comprises: transmitting the transaction data record to the FPGA device via a peripheral component interconnect express (PCIe) bus, and wherein receiving the encrypted transaction data record from the FPGA device comprises: receiving the encrypted transaction data record from the FPGA device via the PCIe bus.

Clause 17: A computer program product, comprising at least one non-transitory computer-readable medium including one or more instructions that, when executed by at least one processor, cause the at least one processor to: receive a transaction data record comprising transaction data associated with a payment transaction; transmit the transaction data record to a field programmable gate array (FPGA) device of a computing device; select a data record template from among a plurality of templates based on a format of the transaction data record; determine one or more data fields of the transaction data record based on the data record template; and receive an encrypted transaction data record from the FPGA device, wherein data values included in the one or more data fields of the transaction data record are encrypted using an encryption key stored in the FPGA device.

Clause 18: The computer program product of clause 17, wherein the one or more instructions further cause the at least one processor to: store the encrypted transaction data record in a database based on receiving the encrypted transaction data record from the FPGA device.

Clause 19: The computer program product of clauses 17 or 18, wherein the one or more instructions further cause the at least one processor to: receive a request for the transaction data record; retrieve the encrypted transaction data record from the database based on the request for the transaction data record; transmit the encrypted transaction data record to the FPGA device; receive a decrypted transaction data record from the FPGA device, wherein the data values included in the one or more data fields of the encrypted transaction data record are decrypted using an decryption key stored in the FPGA device.

Clause 20: The computer program product of any of clauses 17-19, wherein the encryption key is a first encryption key and wherein the one or more instructions further cause the at least one processor to: receive data associated with a second encryption key; and update a configuration of the FPGA device based on the data associated with the second encryption key.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of non-limiting embodiments or aspects are explained in greater detail below with reference to the exemplary embodiments that are illustrated in the accompanying schematic figures, in which:

FIGS. 4A-4H are diagrams of a non-limiting embodiment of an implementation described herein.

DESCRIPTION

Figure 1A:
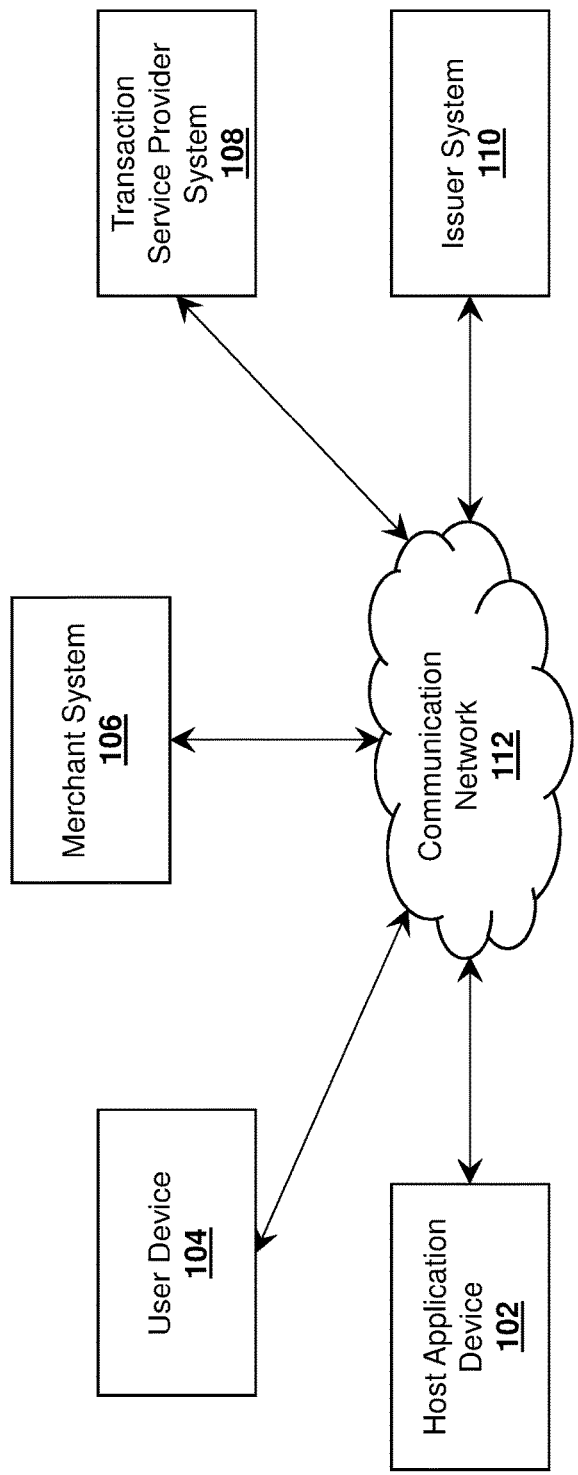
FIG. 1A is a diagram of a non-limiting embodiment of an environment in which systems, devices, computer program products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions such as such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier of an account that is used as a substitute or replacement for another account identifier, such as a PAN. Tokens may be associated with a PAN or other original account identifier in one or more data structures (e.g., one or more databases) such that they may be used to conduct a payment transaction without directly using an original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods, services, and/or access to goods and/or services, to a user (e.g., a customer, a consumer, and/or the like) based on a transaction such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices, which may be used by a merchant to conduct a transaction (e.g., a payment transaction) and/or process a transaction. Additionally or alternatively, a POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments, a transaction service provider may include a credit card company, a debit card company, a payment network such as Visa®, Master-Card®, AmericanExpress®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "payment device" may refer to a payment card (e.g., a credit or debit card), a gift card, a smart card (e.g., a chip card, an integrated circuit card, and/or the like), smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "computing device" may refer to one or more electronic devices (e.g., processors, storage devices, and/or similar computer components) that are configured to directly or indirectly communicate with or over one or more networks. In some non-limiting embodiments, a computing device may include a mobile device. A mobile device may include a smartphone, a portable computer, a wearable device (e.g., watches, glasses, lenses, clothing, and/or the like), a personal digital assistant (PDA), and/or other like devices. In some non-limiting embodiments, a computing device may include a server, a desktop computer, and/or the like.

As used herein, the terms "client" and "client device" may refer to one or more computing devices that access a service made available by a server. In some non-limiting embodiments, a "client device" may refer to one or more devices that facilitate payment transactions, such as one or more POS devices used by a merchant. In some non-limiting embodiments, a client device may include a computing device configured to communicate with one or more networks and/or facilitate payment transactions such as, but not limited to, one or more desktop computers, one or more mobile devices, and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices that communicate with client devices and/or other computing devices over a communication network and/or, in some examples, facilitate communication among other computing devices and/or client devices.

As used herein, the term "system" may refer to one or more combinations of computing devices. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

In some non-limiting embodiments, systems, computer-implemented methods, and computer program products for encrypting sensitive data using a field programmable gate array (FPGA) device are disclosed. For example, in one non-limiting embodiment, a system including at least one host application processor and at least one FPGA device coupled to the at least one host application processor via a communication bus, the at least one host application processor is programmed or configured to receive a transaction data record comprising transaction data associated with a payment transaction, transmit the transaction data record to the at least one FPGA device via the communication bus, and receive an encrypted transaction data record from the at least one FPGA device via the communication bus, wherein one or more data fields of the transaction data record are encrypted to generate the encrypted transaction data record.

In this way, non-limiting embodiments of the present disclosure may allow for encrypting sensitive data using an encryption key and/or decrypting sensitive data using a decryption key that does not involve transmitting the encryption key and/or decryption key over a communication network. In addition, the system may be able to parse transaction data included in a transaction data record in a parallel process using the at least one FPGA device. In this way, the system may reduce an amount of time associated with parsing the transaction data as compared to parsing the transaction data in a serial process.

Referring now to FIG. 1A, FIG. 1A is a diagram of a non-limiting embodiment of an environment 100 in which devices, systems, methods, and/or products described herein may be implemented. As shown in FIG. 1A, environment 100 includes host application device 102, user device 104, merchant system 106, transaction service provider system 108, and issuer system 110. Host application device 102, user device 104, merchant system 106, transaction service provider system 108, and issuer system 110 may interconnect (e.g., establish a connection to communicate and/or the like) via wired connections, wireless connections, or a combination of wired and wireless connections.

Host application device 102 may include a device capable of being in communication with user device 104, merchant system 106, transaction service provider system 108, and/or issuer system 110 via communication network 112. For example, host application device 102 may include a computing device, such as one or more servers and/or other like devices. In some non-limiting embodiments, host application device 102 may be associated with a transaction service provider (e.g., a transaction service provider associated with transaction service provider system 108). For example, host application device 102 may be a component of transaction service provider system 108 associated with the transaction service provider.

User device 104 may include a device capable of being in communication with host application device 102, merchant system 106, transaction service provider system 108, and/or issuer system 110 via communication network 112. For example, user device 104 may include a mobile device, such as a smartphone, a wearable device, a personal digital assistant (PDA), and/or the like. In some non-limiting embodiments, user device 104 may communicate via a short-range wireless communication connection (e.g., a wireless communication connection for communicating information in a range between 2 to 3 centimeters to 5 to 6 meters, such as a near-field communication (NFC) communication connection, a radio frequency identification (RFID) communication connection, a Bluetooth® communication connection, and/or the like). In some non-limiting embodiments, user device 104 may include a POS device associated with a merchant, as described herein.

Merchant system 106 may include one or more devices capable of being in communication with host application device 102, user device 104, transaction service provider system 108, and/or issuer system 110 via communication network 112. For example, merchant system 106 may include one or more computing devices, such as one or more mobile devices, one or more smartphones, one or more wearable devices, one or more PDAs, one or more servers, and/or the like. In some non-limiting embodiments, merchant system 106 may communicate via a short-range wireless communication connection. In some non-limiting embodiments, merchant system 106 may be associated with a merchant, as described herein.

Transaction service provider system 108 may include one or more devices capable of being in communication with host application device 102, user device 104, merchant system 106, and/or issuer system 110 via communication network 112. For example, transaction service provider system 108 may include a server (e.g., a transaction processing server), a group of servers (e.g., a group of transaction processing servers), and/or other like devices. In some non-limiting embodiments, transaction service provider system 108 may be associated with a transaction service provider, as described herein.

Issuer system 110 may include one or more devices capable of being in communication with host application device 102, user device 104, merchant system 106, and/or transaction service provider system 108 via communication network 112. For example, issuer system 110 may include one or more computing devices, such as one or more servers and/or other like devices. In some non-limiting embodiments, issuer system 110 may be associated with an issuer institution that issued a payment account and/or instrument (e.g., a credit account, a debit account, a credit card, a debit card, and/or the like) to a user.

Communication network 112 may include one or more wired and/or wireless networks. For example, communication network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1A are provided as an example. There may be additional systems and/or devices, fewer systems and/or devices, different systems and/or devices, or differently arranged systems and/or devices than those shown in FIG. 1A. Furthermore, two or more systems and/or devices shown in FIG. 1A may be implemented within a single system or a single device, or a single system or a single device shown in FIG. 1A may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 1B:
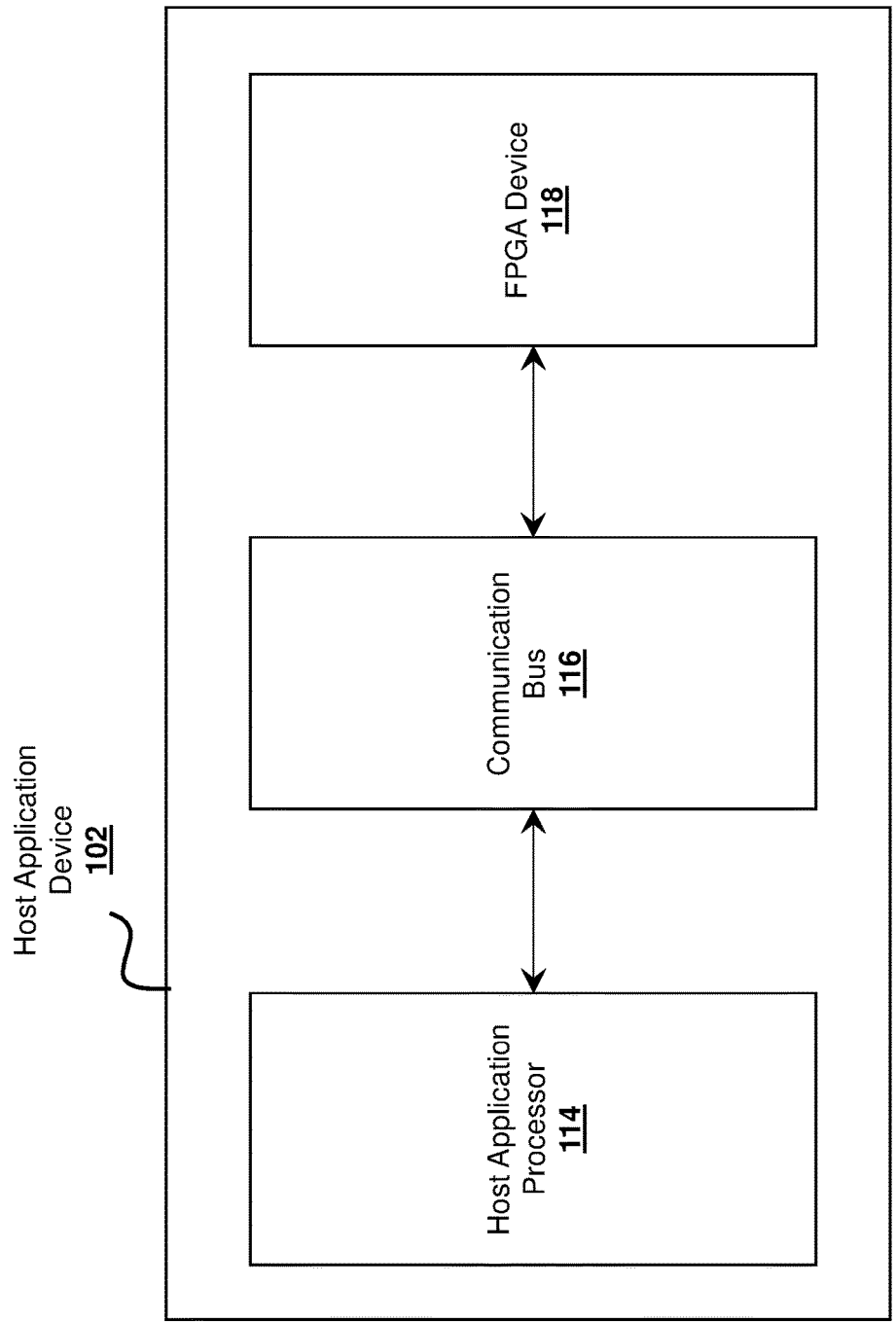
FIG. 1B is a diagram of a non-limiting aspect or embodiment of a host application device according to the present disclosure.

Referring now to FIG. 1B, FIG. 1B is a diagram of a non-limiting embodiment of host application device 102 that includes host application processor 114, communication bus 116, and FPGA device 118. In some non-limiting embodiments, host application processor 114 may include a processor (e.g., a central processing unit (CPU), a graphics processing unit (GPU), an accelerated processing unit (APU), and/or the like), a microprocessor, a digital signal processor (DSP), and/or the like that can be programmed to perform a function. In some non-limiting embodiments, communication bus 116 may include a local computer bus for connecting host application processor 114 and FPGA device 118 in host application device 102. In some non-limiting embodiments, communication bus 116 may include a local computer bus according to peripheral component interconnect (PCI) standard or peripheral component interconnect express (PCIe) standard. In some non-limiting embodiments, FPGA device 118 may include an integrated circuit (IC) that is designed to have a configuration (e.g., a configuration of programmable logic blocks based on hardware elements) that may be changed for a suitable task after the IC is manufactured. For example, FPGA device 118 may include a field programmable gate array (FPGA). In some non-limiting embodiments, the configuration of FPGA device 118 may be specified using a hardware description language (HDL) and/or circuit diagrams.

In some non-limiting embodiments, FPGA device 118 may be a component of a computing device that is separate from host application device 102. For example, host application device 102 may include host application processor 114 and a second computing device (e.g., a server) may include FPGA device 118. In such an example, host application processor 114 may communicate with FPGA device 118 via a communication network (e.g., a communication network that is the same or similar to communication network 112, such as an Ethernet communication network). Additionally, host application processor 114 may communicate with FPGA device 118 based on one or more application programming interface (API) calls (e.g., RESTful API calls).

Figure 2:
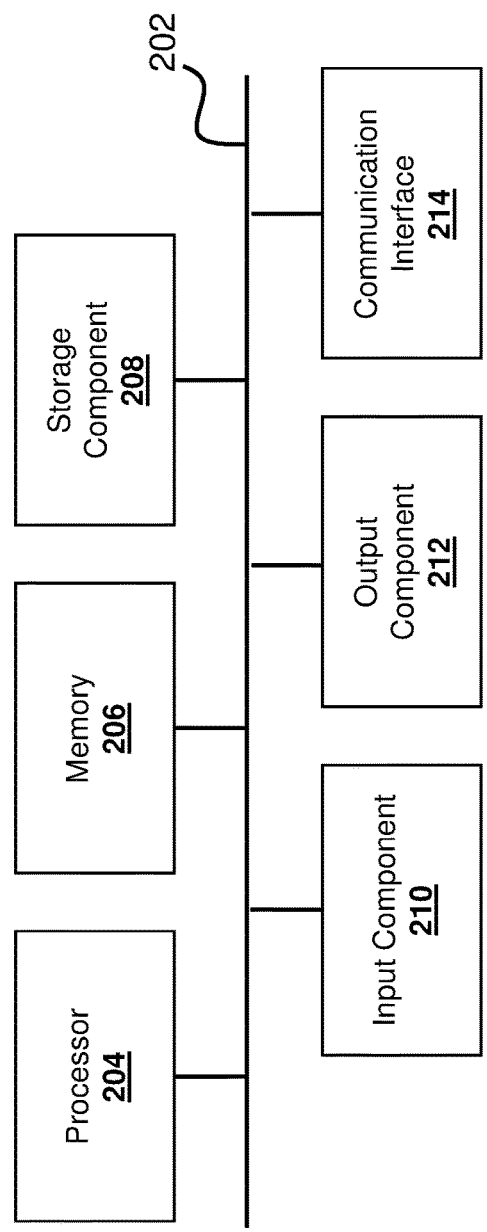
FIG. 2 is a diagram of a non-limiting aspect or embodiment of components of one or more devices and/or one or more systems of FIG. 1A.

Referring now to FIG. 2, FIG. 2 is a diagram of example components of device 200. Device 200 may correspond to host application device 102, user device 104, merchant system 106 (e.g., one or more devices of merchant system 106), transaction service provider system 108 (e.g., one or more devices of transaction service provider system 108), and/or issuer system 110 (e.g., one or more devices of issuer system 110). In some non-limiting aspects or embodiments, host application device 102, user device 104, merchant system 106, transaction service provider system 108, and/or issuer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting aspects or embodiments, processor 204 (e.g., host application processor 114) may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or the like that can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a separate receiver and transmitter, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database and/or the like). Device 200 may be capable of retrieving information from, storing information in, or searching information stored in the data storage or one or more data structures in memory 206 and/or storage component 208. For example, the information may include encryption data, input data, output data, transaction data, account data, or any combination thereof.

The number and arrangement of components shown in FIG. 2 are provided as an example. In some non-limiting aspects or embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
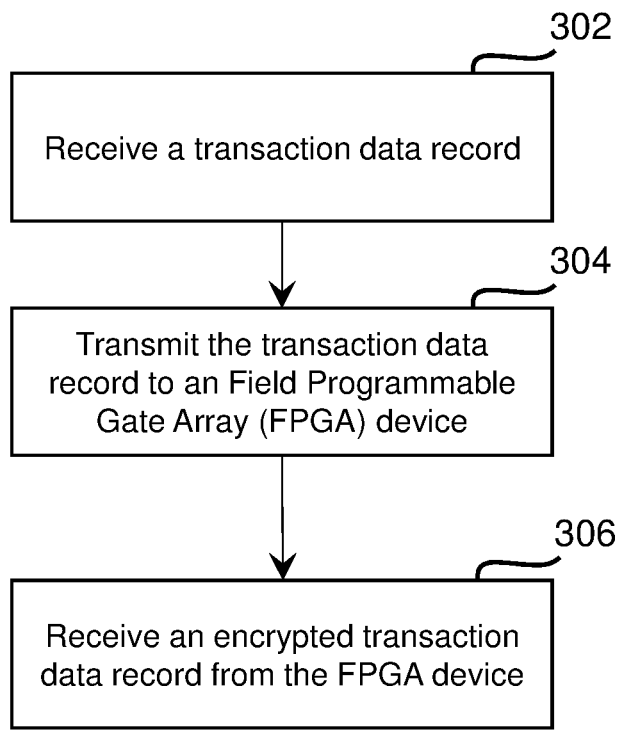
FIG. 3 is a flowchart of a non-limiting aspect or embodiment of a process for encrypting sensitive data using a field programmable gate array (FPGA) device.

Referring now to FIG. 3, FIG. 3 is a flowchart of a non-limiting embodiment of a process 300 for encrypting sensitive data using a field programmable gate array (FPGA) device. In some non-limiting aspects or embodiments, one or more of the functions described with respect to process 300 may be performed (e.g., completely, partially, and/or the like) by host application device 102. In some non-limiting embodiments, one or more of the steps of process 300 may be performed (e.g., completely, partially, and/or the like) by another device or a group of devices separate from and/or including user device 104, merchant system 106, transaction service provider system 108, and/or issuer system 110.

As shown in FIG. 3, at step 302, process 300 may include receiving a transaction data record. For example, host application device 102 (e.g., host application processor 114 of host application device 102) may receive one or more transaction data records from user device 104, merchant system 106, transaction service provider system 108, and/or issuer system 110. In some non-limiting embodiments, the transaction data record may include a plurality of fields that contain values. For example, the transaction data record may include one or more data fields that are associated with one or more values of transaction data. The transaction data may include transaction data associated with a payment transaction involving an account of a consumer, such as a user associated with user device 104. In the example above, the transaction data record may include one or more delimiter fields that are used to separate data fields of the transaction data record.

In some non-limiting embodiments, one or more data fields of a transaction data record may include data values for the transaction data associated with a signal payment transaction involving an account. For example, a first data field of the one or more data fields may include a data value for an account identifier, such as an account number (e.g., a PAN). In such an example, a second data field of the one or more data fields may include a data value for an identifier of a consumer who owns the account (e.g., an accountholder identifier, a cardholder identification number, a name of a consumer who owns the account, and/or the like). Additionally, a third data field of the one or more data fields may include a data value for an account balance of the account. In some non-limiting embodiments, a data value of a data field may include sensitive data (e.g., confidential data) that is not allowed to be stored in a readily identifiable fashion (e.g., an unencrypted fashion) based on laws and/or regulations associated with the storage of transaction data.

In some non-limiting embodiments, host application device 102 (e.g., host application processor 114 of host application device 102) may receive a plurality of transaction data records in a data file. For example, host application device 102 may receive a data file for an account that includes the plurality of transaction data records, where each transaction data record includes data values for transaction data associated with a signal payment transaction involving the account. In some non-limiting embodiments, a transaction data record may have a format (e.g., a specific data format). For example, the transaction data record may have a format that includes a delimiter field that separates each data field (e.g., each data field that includes a data value) in the transaction data record. In some non-limiting embodiments, a delimiter field may have a value that includes a special character. For example, the delimiter field may have a value of a TAB character or a special character associated with a carriage return and/or a line feed.

In some non-limiting embodiments, host application device 102 may store one or more data record templates for each transaction data record of a plurality of transaction data records based on a format of each of the transaction data records. A data record template may include a definition of a structure of the transaction data record (e.g., the relationship between the location of a delimiter value and the location of a data value in the transaction data record) based on the format of the transaction data record. In some non-limiting embodiments, host application device 102 may store the one or more data record templates prior to receiving a transaction data record.

In some non-limiting embodiments, host application device 102 (e.g., host application processor 114 of host application device 102) may store one or more transaction data records based on receiving the transaction data record. For example, host application device 102 may store the one or more transaction data records in random access memory (RAM) of host application device 102 based on a driver associated with communication bus 116 so that the one or more transaction data records may be retrieved by FPGA device 118.

As shown in FIG. 3, at step 304, process 300 may include transmitting the transaction data record to a field programmable gate array (FPGA) device. For example, host application processor 114 may transmit one or more transaction data records to FPGA device 118 via communication bus 116. In some non-limiting embodiments, FPGA device 118 may receive the one or more transaction data records via communication bus 116 based on host application processor 114 transmitting the one or more transaction data records.

In some non-limiting embodiments, FPGA device 118 may parse one or more transaction data records. For example, FPGA device 118 may retrieve one or more transaction data records and parse transaction data included in the one or more transaction data records. In some non-limiting embodiments, FPGA device 118 may parse a plurality of transaction data records by processing the plurality of transaction data records in a parallel process. For example, FPGA device 118 may parse the plurality of transaction data records by performing a plurality of operations on a plurality of data fields of a set of transaction data records (e.g., corresponding data fields of a set of transaction data records) of the plurality of transaction data records simultaneously. In this way, FPGA device 118 of host application device 102 may more quickly process a plurality of transaction data records as compared to a central processing unit (CPU) that processes the plurality of transaction data records in a serial process. In some non-limiting embodiments, FPGA device 118 may perform a plurality of operations on the plurality of data fields of the set of transaction data records during a single clock cycle of a clock associated with FPGA device 118.

In some non-limiting embodiments, FPGA device 118 may store transaction data in RAM device (e.g., based on a driver associated with communication bus 116). For example, FPGA device 118 may store the transaction data in the RAM based on parsing a plurality of transaction data records so that the transaction data may be retrieved by host application processor 114. In some non-limiting embodiments, host application processor 114 may receive the transaction data that was included in the plurality of transaction data records and store the transaction data in a data structure (e.g., a database). For example, host application processor 114 may retrieve the transaction data from the RAM and store the transaction data in the data structure based on retrieving the transaction data.

As shown in FIG. 3, at step 306, process 300 may include receiving an encrypted transaction data record from the FPGA device. For example, host application processor 114 may receive an encrypted transaction data record from FPGA device 118. In some non-limiting embodiments, one or more data fields (e.g., one or more data values of one or more data fields) of the transaction data record are encrypted by FPGA device 118 to generate the encrypted transaction data record. For example, FPGA device 118 may retrieve an encryption key stored in read-only memory (ROM) of FPGA device 118, and FPGA device 118 may encrypt the one or more data fields of the transaction data record using the encryption key. In some non-limiting embodiments, host application processor 114 may store the encrypted transaction data record in a data structure. For example, host application processor 114 may store the encrypted transaction data record in the data structure based on receiving the encrypted transaction data record from FPGA device 118. In some non-limiting embodiments, host application processor 114 may store the encrypted transaction data record with a data record identifier of the transaction data record that was used to generate the encrypted transaction data record.

In some non-limiting embodiments, host application processor 114 and/or FPGA device 118 may determine one or more data fields of a transaction data record that are to be encrypted. In one example, host application processor 114 and/or FPGA device 118 may determine the one or more data fields of the transaction data record that are to be encrypted based on a data record template. In some non-limiting embodiments, host application processor 114 and/or FPGA device 118 may determine one or more data fields of an encrypted transaction data record that are to be decrypted. For example, host application processor 114 and/or FPGA device 118 may determine the one or more data fields of the encrypted transaction data record that are to be encrypted based on a data record template that is associated with the transaction data record that was used to generate the encrypted transaction data record.

In some non-limiting embodiments, FPGA device 118 may forego encrypting one or more fields of a transaction data record. For example, FPGA device 118 may forego encrypting one or more fields of the transaction data record where the one or more fields of the transaction data record include one or more data fields reserved for data values that are not sensitive (e.g., not confidential). In some non-limiting embodiments, FPGA device 118 may forego encrypting one or more fields of the transaction data record based on determining that the one or more data fields are reserved for data values that are not sensitive. In some non-limiting embodiments, host application processor 114 and/or FPGA device 118 may determine that one or more data fields of a transaction data record are reserved for data values that are not sensitive based on a data record template associated with the transaction data record.

In some non-limiting embodiments, host application processor 114 may encrypt one or more data fields of a transaction data record using FPGA device 118. For example, host application processor 114 may transmit a command message (e.g., a command script) that causes FPGA device 118 to encrypt the one or more data fields of the transaction data record to generate an encrypted transaction data record. FPGA device 118 may transmit the encrypted transaction data record to host application processor 114 based on encrypting the one or more data fields.

In some non-limiting embodiments, host application processor 114 may decrypt one or more data fields of an encrypted transaction data record using FPGA device 118. For example, host application processor 114 may transmit a command message (e.g., a command script) that causes FPGA device 118 to decrypt the one or more data fields of the encrypted transaction data record to generate a decrypted transaction data record. FPGA device 118 may transmit the decrypted transaction data record to host application processor 114 based on decrypting the one or more data fields.

In some non-limiting embodiments, host application processor 114 may receive a transaction data record and host application processor 114 may select a data record template from among a plurality of data record templates based on a format of the transaction data record. In some non-limiting embodiments, host application processor 114 may determine the one or more fields of the transaction data record based on the data record template. In some non-limiting embodiments, FPGA device 118 may encrypt data values included in the one or more fields of the transaction data record to generate an encrypted transaction data record.

In some non-limiting embodiments, host application processor 114 may receive a decrypted transaction data record from FPGA device 118. For example, host application processor 114 may receive a request (e.g., a request from user device 104, merchant 106, transaction service provider system 108, and/or issuer system 110) for a transaction data record and host application processor 114 may retrieve the encrypted transaction data record from a data structure. In some non-limiting embodiments, host application processor 114 may transmit the encrypted transaction data record to FPGA device 118 and FPGA device 118 may decrypt one or more data fields of the encrypted transaction data record using a decryption key to generate a decrypted transaction data record. In some non-limiting embodiments, the decryption key may be stored in FPGA device 118. In some non-limiting embodiments, FPGA device 118 may transmit the decrypted transaction data record to host application processor 114 based on decrypting one or more data fields of the encrypted transaction data record. In some non-limiting embodiments, host application processor 114 may receive the decrypted transaction data record from FPGA device 118 based on FPGA device 118 transmitting the decrypted transaction data record.

In some non-limiting embodiments, host application processor 114 may retrieve an encrypted transaction data record from a data structure based on receiving a request for a transaction data record (e.g., a request for a transaction data record that was used to generate the encrypted transaction data record). For example, host application processor 114 may determine a data record identifier of the transaction data record that was included in the request for the transaction data record and host application processor 114 may retrieve the encrypted transaction data record from the data structure based on the data record identifier.

In some non-limiting embodiments, host application processor 114 may update a configuration of FPGA device 118. For example, host application processor 114 may receive data associated with an encryption key and/or data associated with an encryption algorithm. Host application processor 114 may update or cause FPGA device 118 to update the configuration of FPGA device 118 based on the data associated with the encryption key and/or data associated with the encryption algorithm. In another example, host application processor 114 may receive data associated with a decryption key and/or data associated with a decryption algorithm. Host application processor 114 may update or cause FPGA device 118 to update the configuration of FPGA device 118 based on the data associated with the decryption key and/or data associated with the decryption algorithm.

Referring now to FIGS. 4A-4H, FIGS. 4A-4H are flowcharts of a non-limiting embodiment or aspect of an implementation 400 relating to a process for encrypting sensitive data using an FPGA device. As illustrated in FIGS. 4A-4H, implementation 400 may include host application device 402 and/or transaction service provider system 408. In some non-limiting embodiments, host application device 402 may be the same as, or similar to, host application device 102. In some non-limiting embodiments, transaction service provider system 408 may be the same as, or similar to, transaction service provider system 108. In some non-limiting embodiments, host application device 402 may include host application processor 414, PCIe bus 416, and/or FPGA device 418. In some non-limiting embodiments, host application processor 414 may be the same as, or similar to, host application processor 114. In some non-limiting embodiments, PCIe bus 416 may be the same as, or similar to, communication bus 116. In some non-limiting embodiments, FPGA device 418 may be the same as, or similar to, FPGA device 118.

Figure 4A:
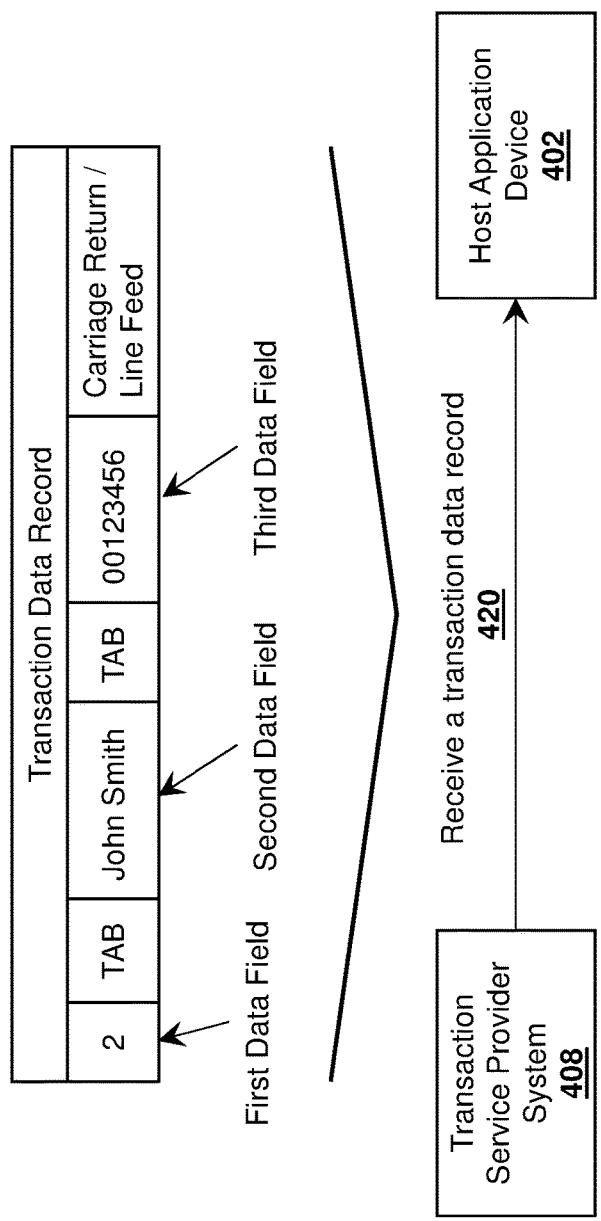

As shown by reference number 420 in FIG. 4A, host application device 402 may receive a transaction data record from transaction service provider system 408. For example, host application device 402 (e.g., host application processor 414 of host application device 402) may receive the transaction data record from the transaction service provider system 408. In some non-limiting embodiments, the transaction data record may include transaction data associated with a payment transaction. For example, the data associated with the payment transaction may include format data associated with a format of the transaction data record, account holder data associated with an identifier for an account holder of a payment account, account identification data associated with an identifier for the payment account, and/or the like. In some non-limiting embodiments, data included in the data associated with the payment transaction may be included in one or more data fields of the transaction data record. For example, a first field of the transaction data record may include the format data associated with the format of the transaction data record, a second field of the transaction data record may include the account holder data associated with the identifier for an account holder of a payment account, a third field of the transaction data record may include the account identification data associated with the identifier for the payment account, and/or the like.

Figure 4B:
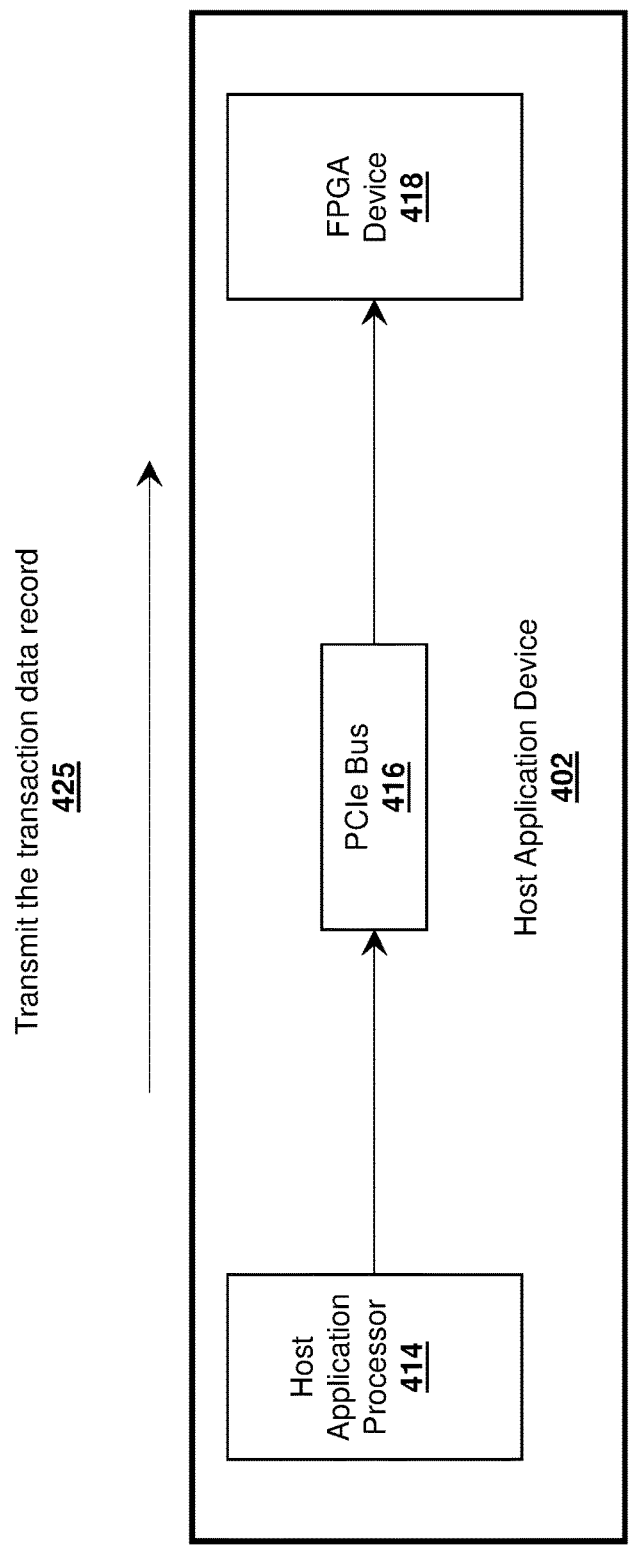

As shown by reference number 425 in FIG. 4B, host application processor 414 may transmit the transaction data record to FPGA device 418. For example, host application processor 414 may transmit the transaction data record to FPGA device 418 via a communication bus. In such an example, host application processor 414 may transmit the transaction data record to FPGA device 418 via PCIe bus 416. In some non-limiting embodiments, host application processor 414 may transmit the transaction data record to PCIe bus 416 and PCIe bus 416 may transmit the transaction data record to FPGA device 418 based on receiving the transaction data record. In some non-limiting embodiments, host application processor 414 may transmit the transaction data record to FPGA device 418 based on host application processor 414 receiving the transaction data record from transaction service provider system 408.

As shown by reference number 430 in FIG. 4C, FPGA device 418 may select a data record template from among a plurality of data record templates. For example, FPGA device 418 may select a data record template from among a plurality of data record templates based on a format of the transaction data record. In some non-limiting embodiments, FPGA device 418 may select the data record template from among the plurality of data record templates based on the format data associated with the format of the transaction data record included in the transaction data record. For example, FPGA device 418 may select the data record template from among the plurality of data record templates based on FPGA device 418 comparing the format data associated with the format of the transaction data record to one or more data record templates of the plurality of data record templates. In such an example, the one or more data record templates of the plurality of data record templates may each include, respectively, format data associated with a format for each data record template. In some non-limiting embodiments, the format data associated with the format for each data record template may specify one or more data fields to be encrypted. For example, the format data associated with the format for each data record template may specify one or more data fields to be encrypted by FPGA device 418. In one such example, the format data associated with the format for a first data record template may specify that a first field is original (e.g., not encrypted), a second field is encrypted, and a third field is encrypted. In another example, the format data associated with the format for a second data record template may specify that a first field is original, a second field is original, and a third field is encrypted.

Figure 4D:
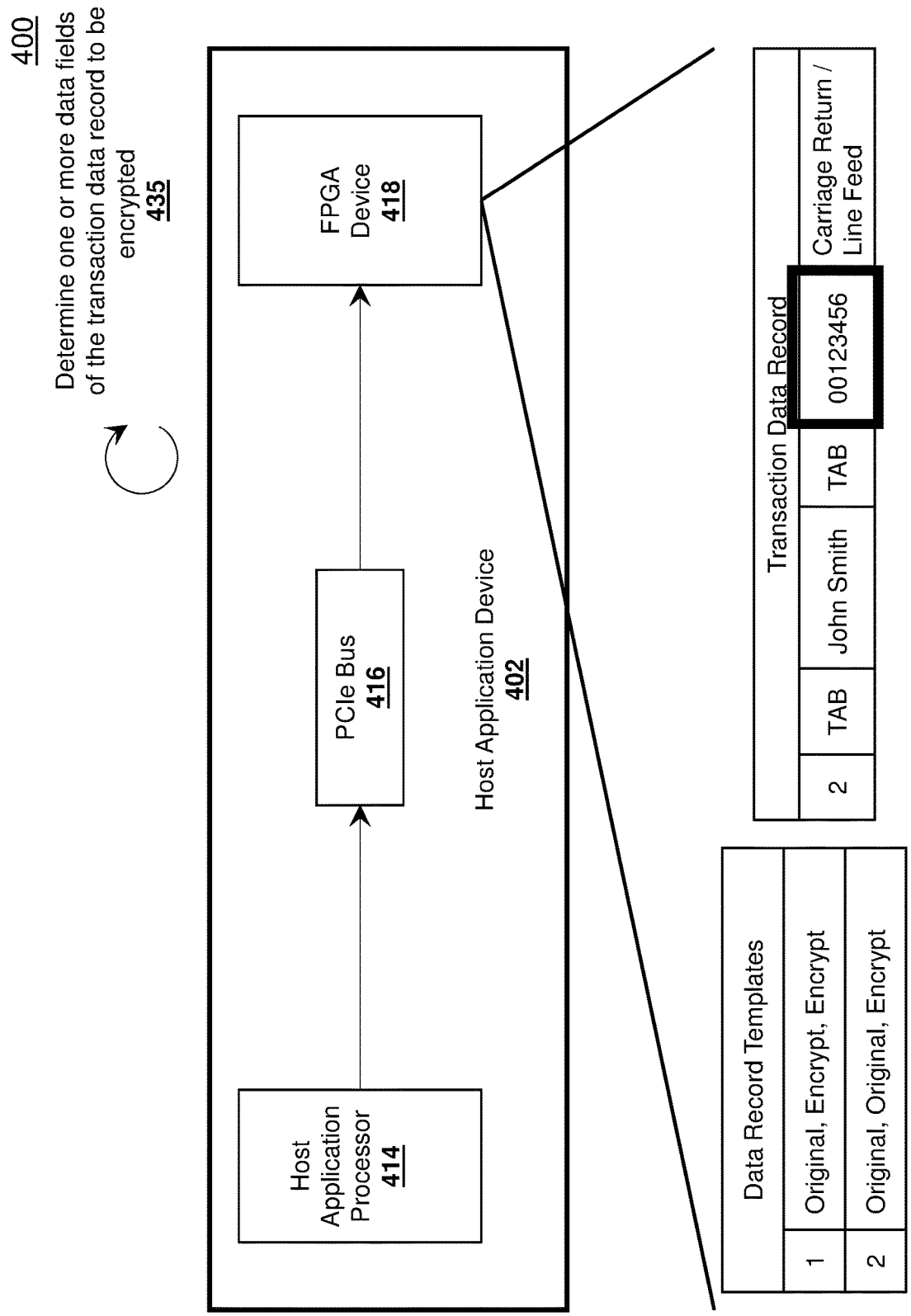

As shown by reference number 435 in FIG. 4D, FPGA device 418 may determine one or more data fields of the transaction data record to be encrypted based on the data record template that was selected. For example, FPGA device 418 may determine that a third field of the transaction data record should be encrypted based on the data record template that was selected. In such an example, FPGA device 418 may determine that the format data associated with the format of the data record template that was selected specifies that one or more data fields of the transaction data record should be encrypted.

Figure 4E:
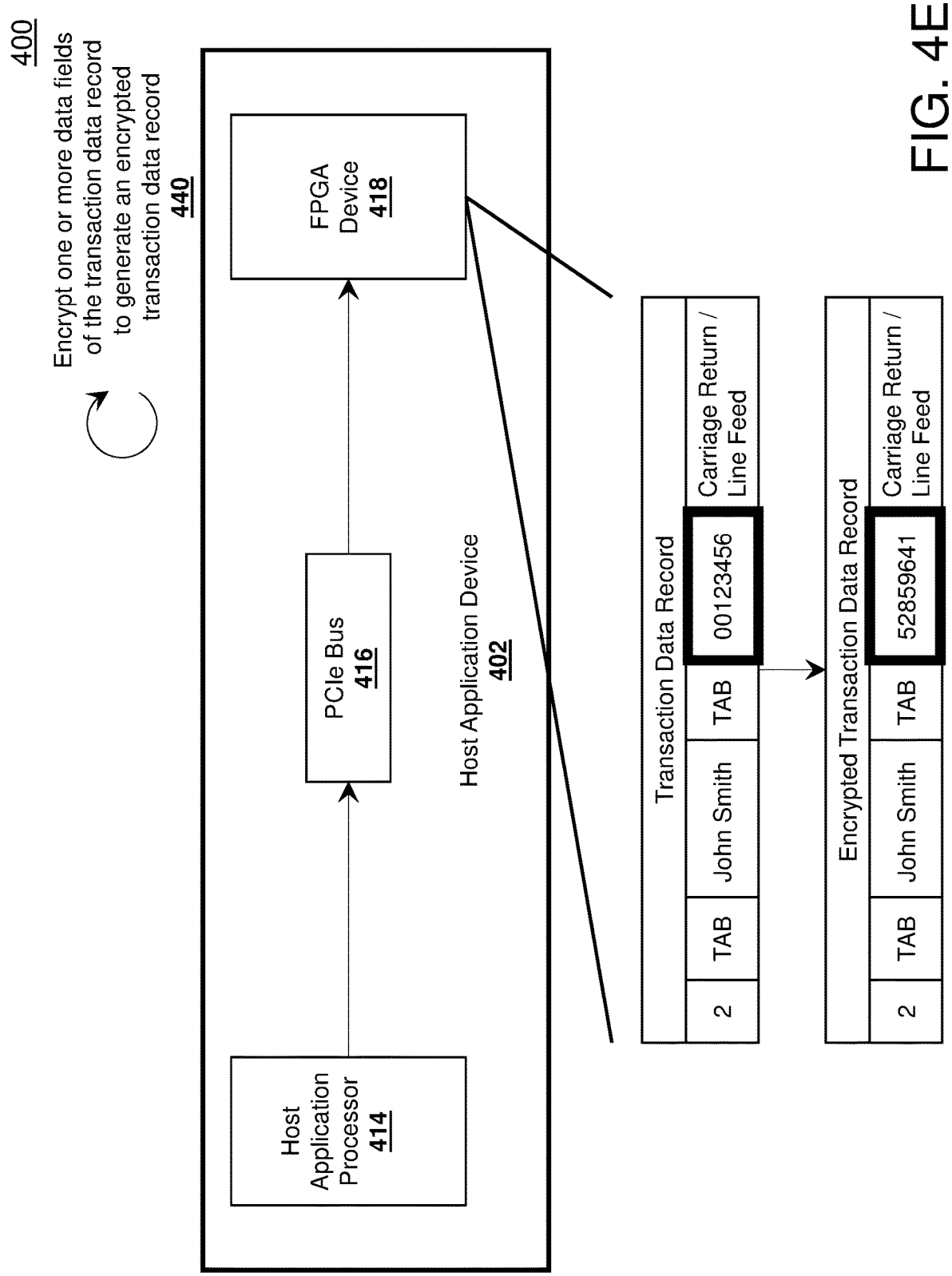

As shown by reference number 440 in FIG. 4E, FPGA device 418 may encrypt one or more data fields of the transaction data record to generate an encrypted transaction data record. For example, FPGA device 418 may encrypt one or more data fields of the transaction data record to generate an encrypted transaction data record based on FPGA device 418 determining the one or more data fields of the transaction data record to be encrypted. In some non-limiting embodiments, FPGA device 418 may encrypt data values (e.g., the format data associated with the format of the transaction data record, the account holder data associated with the identifier of the account holder of the payment account, the account identification data associated with the identifier for the payment account, and/or the like) included in the one or more data fields of the data transaction data record. For example, FPGA device 418 may encrypt data values included in the one or more data fields of the data transaction data record based on (e.g., using) an encryption key (e.g., a symmetric encryption key, an asymmetric encryption key, a public encryption key, a private encryption key, and/or the like). In some non-limiting embodiments, the encryption key may be stored in FPGA device 418. For example, the encryption key may be stored in read-only memory (ROM) of FPGA device 418.

As shown by reference number 445 in FIG. 4F, FPGA device 418 may transmit the encrypted transaction data record to host application processor 414 via PCIe bus 416. For example, FPGA device 418 may transmit the encrypted transaction data record to host application processor 414 via PCIe bus 416 based on FPGA device 418 generating the encrypted transaction data record.

Figure 4G:
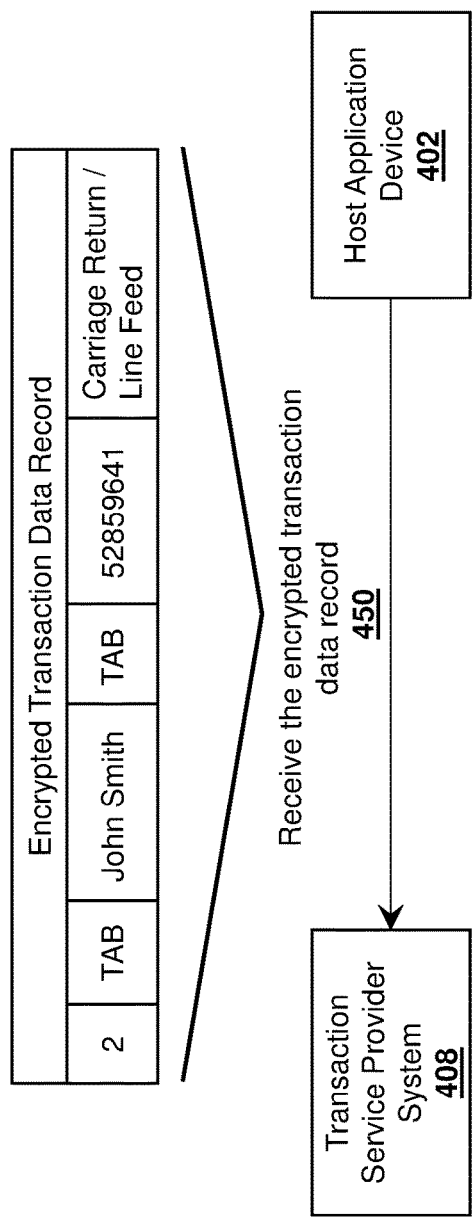

As shown by reference number 450 in FIG. 4G, transaction service provider system 408 may receive the encrypted transaction data record. For example, transaction service provider system 408 may receive the encrypted transaction data record from host application device 402. In such an example, host application device 402 (e.g., host application processor 414 of host application device 402) may transmit the encrypted transaction data record to transaction service provider system 408.

Figure 4H:
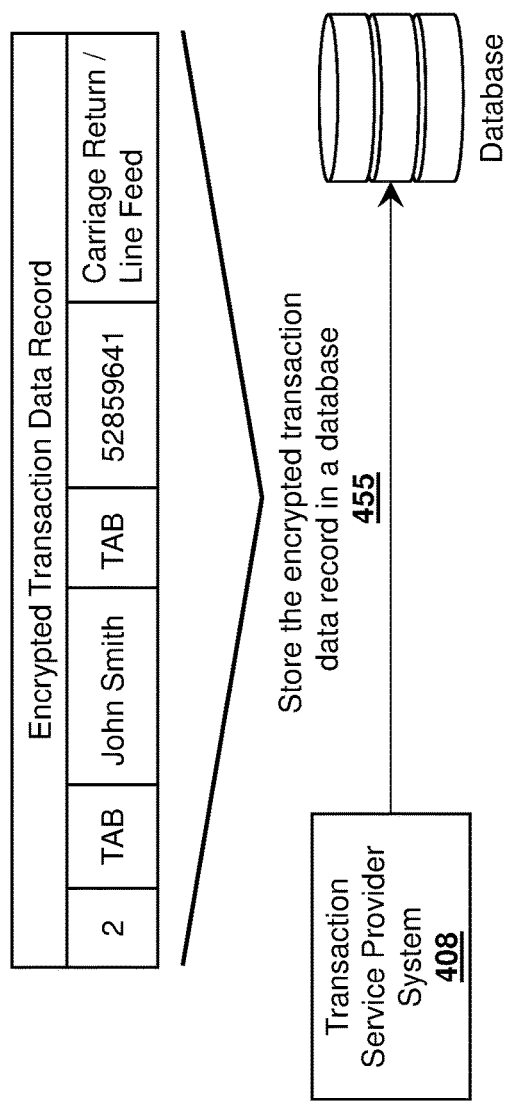

As shown by reference number 455 in FIG. 4H, transaction service provider system 408 may store the encrypted transaction data record in a database. For example, transaction service provider system 408 may store the encrypted transaction data record in a database based on transaction service provider system 408 receiving the encrypted transaction data record. In some non-limiting embodiments, transaction service provider system 408 may store the encrypted transaction data record in a database with a data record identifier.

Although the above systems, methods, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, at least one feature of any embodiment or aspect can be combined with at least one feature of any other embodiment or aspect.

What is claimed is:

1. A system, comprising:
    at least one field programmable gate array (FPGA) device programmed or configured to:
        receive a transaction data record via a communication bus, wherein the transaction data record comprises transaction data associated with a payment transaction;
        encrypt one or more data fields of the transaction data record to generate an encrypted transaction data record, wherein, when encrypting the one or more data fields of the transaction data record to generate the encrypted transaction data record, the at least one FPGA device is programmed or configured to:
            select a data record template from among a plurality of data record templates based on a format of the transaction data record;
            determine the one or more data fields of the transaction data record based on the data record template; and
            encrypt data values included in the one or more data fields of the transaction data record using an encryption key stored in the at least one FPGA device; and
        transmit the encrypted transaction data record via the communication bus, wherein one or more data files of the transaction data are encrypted to generate the encrypted transaction data record.

2. The system of claim 1, wherein when encrypting the one or more data fields of the transaction data record to generate the encrypted transaction data record, the at least one FPGA device is configured to:
    encrypt the one or more data fields of the transaction data record using an encryption key stored in read-only memory (ROM) of the at least one FPGA device.

3. The system of claim 1, when encrypting the one or more data fields of the transaction data record to generate the encrypted transaction data record, the at least one FPGA device is configured to:
    retrieve an encryption key stored in a read-only memory (ROM) of the at least one FPGA device.

4. The system of claim 1, wherein when receiving the transaction data record, the at least one FPGA device is programmed or configured to:
    receive the transaction data record from at least one processor via a peripheral component interconnect express (PCIe) bus.

5. The system of claim 4, wherein when receiving the transaction data record from the at least one processor, the PCIe bus is programmed or configured to:
    receive the transaction data from the at least one processor; and
    based on receiving the transaction data record, transmit the transaction data record to the at least one FPGA device.

6. The system of claim 1, wherein the transaction data record comprises format data associated with the format of the transaction data, and wherein when selecting the data record template from among the plurality of data record templates, the at least one FPGA device is programmed or configured to:
    select the data record template from among the plurality of data record templates based on the format data associated with the format of the transaction data record.

7. The system of claim 1, wherein when transmitting the encrypted transaction data record, the at least one FPGA device is programmed or configured to:
    transmit the encrypted transaction data record to at least one processor via a peripheral component interconnect express (PCIe) bus.

8. The system of claim 7, wherein when transmitting the encrypted transaction data record to the at least one processor, the PCIe bus is programmed or configured to:

receive the encrypted transaction data record from the at least one FPGA device; and based on receiving the encrypted transaction data record, transmit the encrypted transaction data record to the at least one processor.

9. A computer-implemented method, comprising:

receiving, with at least one field programmable gate array (FPGA) device, a transaction data record via a communication bus, wherein the transaction data record comprises transaction data associated with a payment transaction;

encrypting, with the at least one FPGA device, one or more data fields of the transaction data record to generate an encrypted transaction data record, wherein encrypting comprises:

selecting a data record template from among a plurality of data record templates based on a format of the transaction data record;

determining the one or more data fields of the transaction data record based on the data record template; and encrypting data values included in the one or more data fields of the transaction data record using an encryption key stored in the at least one FPGA device; and transmitting, with the at least one FPGA device, the encrypted transaction data record via the communication bus, wherein the one or more data files of the transaction data are encrypted to generate the encrypted transaction data record.

10. The computer-implemented method of claim 9, wherein the one or more data fields are one or more first data fields of the transaction data record and wherein encrypting the one or more first data fields of the transaction data record comprises:

foregoing encrypting one or more second data fields of the transaction data record, wherein the one or more second data fields of the transaction data record comprise one or more data fields reserved for non-confidential data.

11. The computer-implemented method of claim 9, wherein encrypting the one or more data fields of the transaction data record to generate the encrypted transaction data record comprises:

retrieving an encryption key stored in a read-only memory (ROM) of the at least one FPGA device.

12. The computer-implemented method of claim 9, wherein receiving the transaction data record comprises:

receiving the transaction data record from at least one processor via a peripheral component interconnect express (PCIe) bus.

13. The computer-implemented method of claim 12, wherein receiving the transaction data record from the at least one processor via the PCIe bus comprises:

receiving, with the PCIe bus, the transaction data record from the at least one processor; and based on receiving the transaction data record, transmitting, with the PCIe bus, the transaction data record to the at least one FPGA device.

14. The computer-implemented method of claim 9, wherein the transaction data record comprises format data associated with the format of the transaction data, and wherein selecting the data record template from among the plurality of data record templates comprises:

selecting the data record template from among the plurality of data record templates based on the format data associated with the format of the transaction data record.

15. The computer-implemented method of claim 9, wherein transmitting the encrypted transaction data record comprises:

transmitting the encrypted transaction data record to at least one processor via a peripheral component interconnect express (PCIe) bus.

16. The computer-implemented method of claim 15, wherein transmitting the encrypted transaction data record to the at least one processor via a PCIe bus comprises:

receiving, with the PCIe bus, the encrypted transaction data record from the at least one FPGA device; and based on receiving the encrypted transaction data record, transmitting, with the PCIe bus, the encrypted transaction data record to the at least one processor.

17. A computer program product, comprising at least one non-transitory computer-readable medium including one or more instructions that, when executed by at least one field programmable array (FPGA) device, cause the at least one FPGA device to:

receive a transaction data record via a communication bus, wherein the transaction data record comprises transaction data associated with a payment transaction;

encrypt one or more data fields of the transaction data record to generate an encrypted transaction data record, wherein the one or more instructions that cause the at least one FPGA device to encrypt the one or more data fields of the transaction data record to generate the encrypted transaction data record cause the at least one FPGA device to:

select a data record template from among a plurality of data record templates based on a format of the transaction data record;

determine one or more data fields of the transaction data record based on the data record template; and encrypt data values included in the one or more data fields of the transaction data record using an encryption key stored in the at least one FPGA device; and transmit the encrypted transaction data record via the communication bus, wherein one or more data files of the transaction data are encrypted to generate the encrypted transaction data record.

18. The computer program product of claim 17, wherein the one or more instructions further cause the at least one FPGA device to:

retrieve an encryption key stored in a read-only memory (ROM) of the at least one FPGA device.

19. The computer program product of claim 17, wherein when receiving the transaction data record the one or more instructions further cause the at least one FPGA device to:

receive the transaction data record from at least one processor via a peripheral component interconnect express (PCIe) bus.

20. The computer program product of claim 17, wherein the transaction data record comprises format data associated with the format of the transaction data, and wherein when selecting the data record template from among the plurality of data record templates, the one or more instructions cause the at least one FPGA device to:

select the data record template from among the plurality of data record templates based on the format data associated with the format of the transaction data record.

* * * * *